US009827909B2

United States Patent
Szmolenszki et al.

(10) Patent No.: US 9,827,909 B2
(45) Date of Patent: Nov. 28, 2017

(54) EXTERIOR REAR VIEW MIRROR AND PROCESS FOR ITS ASSEMBLY

(71) Applicant: SMR Patents S.a.r.l., Luxemburg (LU)

(72) Inventors: Istvan Szmolenszki, Schwaikheim (DE); Andreas Herrmann, Winnenden-Baach (DE)

(73) Assignee: SMR Patents S.à.r.l., Stuttgart (DE)

( * ) Notice: Subject to any disclaimer, the term of this patent is extended or adjusted under 35 U.S.C. 154(b) by 97 days.

(21) Appl. No.: 14/849,477

(22) Filed: Sep. 9, 2015

(65) Prior Publication Data

US 2015/0375681 A1 Dec. 31, 2015

Related U.S. Application Data

(63) Continuation of application No. 13/197,230, filed on Aug. 3, 2011, now abandoned.

(30) Foreign Application Priority Data

Aug. 3, 2010 (EP) ..................................... 10171710

(51) Int. Cl.
*B60R 1/06* (2006.01)
*B60R 1/062* (2006.01)

(52) U.S. Cl.
CPC ................ *B60R 1/06* (2013.01); *B60R 1/062* (2013.01); *Y10T 29/49826* (2015.01)

(58) Field of Classification Search
CPC .. B60R 1/006; B60R 1/02; B60R 1/06; B60R 1/0607–1/076
See application file for complete search history.

(56) References Cited

U.S. PATENT DOCUMENTS

| 5,198,929 | A  | 3/1993 | Clough |
| 6,174,062 | B1 | 1/2001 | Schillegger et al. |
| 6,341,536 | B1 | 1/2002 | Guttenberger et al. |
| 6,347,872 | B1 | 2/2002 | Brechbill et al. |
| 6,390,635 | B2 | 5/2002 | Whitehead et al. |
| 6,409,353 | B1 | 6/2002 | Guttenberger |
| 6,447,129 | B2 | 9/2002 | Hayashi et al. |
| 7,448,589 | B2 | 11/2008 | Blakeman et al. |
| 2002/0057507 | A1 | 5/2002 | Guttenberger et al. |

(Continued)

FOREIGN PATENT DOCUMENTS

| EP | 0822120 A2 | 2/1988 |
| EP | 0620138 A1 | 3/1994 |

OTHER PUBLICATIONS

European Search Report for application No. EP 10 17 1710 dated Mar. 30, 2011.

*Primary Examiner* — Thomas K Pham
*Assistant Examiner* — Cara Rakowski
(74) *Attorney, Agent, or Firm* — Simonelli IP, PLLC

(57) ABSTRACT

An exterior rear view mirror of an exterior rear view mirror assembly for a motor vehicle is described. The exterior rear view mirror includes: an exterior rear view mirror housing, a base bracket, at least partly accommodated in the exterior rear view mirror housing, a frame with walls, which surround an opening arranged on the rear side of the exterior rear view mirror housing, for a mirror glass, and an adjusting device, attached to the base bracket, for the mirror glass. The frame is attached to the adjusting device. In addition, a process for assembly of an exterior rear view mirror of this type is described.

8 Claims, 4 Drawing Sheets

(56) References Cited

U.S. PATENT DOCUMENTS

2002/0130241 A1     9/2002  Yoshida
2010/0202072 A1     8/2010  Ferman et al.
2010/0296189 A1*   11/2010  Lettis .................... B60R 1/06
                                                         359/876

* cited by examiner

EXTERIOR REAR VIEW MIRROR AND PROCESS FOR ITS ASSEMBLY

This is a continuation of a U.S. patent application Ser. No. 13/197,230, the invention of which is based on a priority patent application EP 10171710.6 which is hereby incorporated by reference.

BACKGROUND ART

1. Field of the Invention

The invention relates to an exterior rear view mirror of an exterior rear view mirror assembly for a motor vehicle. More particularly, the invention relates to an exterior rear view mirror assembly of simplified construction.

2. Description of the Related Art

An exterior rear view mirror housing includes a base bracket at least partly accommodated in the exterior rear view mirror housing, a frame with walls, which surround an opening arranged on the rear side of the exterior rear view mirror housing, for a mirror glass, and an adjusting device, attached to the base bracket, for the mirror glass, wherein the frame being attached to the base bracket by means of the adjusting device.

A process for assembly of an exterior rear view mirror of this type is built by aligning the frame and the adjusting device in relation to one another and attaching the frame to the base bracket by means of the adjusting device.

An exterior rear view mirror assembly for a motor vehicle consists, for example, of a mirror base arranged on the motor vehicle, which can be covered by means of a mirror base cover, and an exterior rear view mirror arranged on the mirror base. The exterior rear view mirror includes an exterior rear view mirror housing, which, inter alia, houses the base bracket assigned to the mirror base.

The mirror base and the base bracket are hinged together, so that the exterior rear view mirror can be pivoted about a hinge axis in relation to the mirror base from an operating position into a folding position and vice versa. The mirror base and base bracket can be produced from die-casting material, for example, from the same material.

An adjusting device for a mirror glass, driven by an electric motor, for example, is arranged on the base bracket. The adjusting device acts on a backing plate, on which the mirror glass is arranged. The mirror glass can be mounted onto the backing plate by means of an adhesive connection. The backing plate can be guided to and/or mounted on the adjustment device and/or the base plate. The term 'backing plate' here refers to any type of bracket, which comprises at least one bracket surface, with a plane or vaulted design, closed or in a non-continuous grid, for example, honeycombed, on which it is suitable to attach a mirror glass, for example by means of an adhesive connection or by clipping e.g. locking means, protruding behind the perimeter of the bracket surface and arcing inwards towards the centre of the bracket surface, seen from the perimeter.

On its rear side, facing away from the direction of movement of the vehicle in the operating position, the exterior rear view mirror housing comprises an opening, through which the mirror glass is visible, or in which the mirror glass is arranged. In order to ensure that the mirror glass is adjustable, a distance is kept on all sides between the mirror glass or backing plate and the walls of the exterior rear view mirror housing surrounding the opening, so that a gap is given around the mirror glass between the walls of the exterior rear view mirror housing surrounding the opening.

In production of motor vehicle parts, such as an exterior rear view mirror assembly or an exterior rear view mirror, there are many legal regulations to take into account. A legal regulation to protect third parties from injuries, for example, provides permissible minimum radii, which must at least be kept, at least on unprotected, exposed points. These required minimum radii cannot be kept, for example, in mirror glasses. In order to meet the legal requirement, though, it is known to protect the mirror glass by a circumferential frame. The frame surrounds the opening provided for the mirror glass on the rear side of the exterior rear view mirror housing, so that the edges of the mirror glass are not exposed. Here the frame can only surround the walls surrounding the opening, or form a housing section lying around the opening for the mirror glass with the walls surrounding the opening. The external contour of the frame, forming a part of the external side of the exterior rear view mirror housing in the process, here maintains the legally predefined minimum radii around the mirror glass, without the mirror glass being exposed itself with immediate accessibility to its edges.

In addition to, or instead of, an electromotive activation for the adjustment device of the mirror glass, the exterior rear view mirror can accommodate one or several additional electrical components. Examples of electrical components of this type are:

a turn signal indicator,
an entry light,
a heatable mirror glass,
an electro-chromatically dimmable mirror glass,
a detection module and/or warning display module for a driving assistance device, such as blind spot monitoring, a lane departure warning, approach monitoring, or similar,
a sensor for detecting driving and/or surrounding conditions, such as for example, temperature, brightness, degree of pollution, lighting situation, for example, in order to automatically heat the mirror glass, or to dim electro-chromatically, for example.

In addition, the exterior rear view mirror can comprise one or several combinations of the electrical components given as examples.

The electrical components in the exterior rear view mirror are connected to a power supply on the vehicle side, and/or to a control device on the vehicle side, for example, by means of an electrical connection through the mirror base, for example by a vehicle electrical system and/or a bus system. The electrical connection consists, for example, of a cable harness with several cables, if necessary, each with separate plug connections to the electrical terminal of the electrical components, in each case individually or in groups, and at least one electrical plug connection for continuative electrical contacting on the vehicle side.

For example, in order to simplify the assembly of the different components, at least partly housed in the inside of the exterior rear view mirror housing, component groups, as well as, if necessary, their electrical connections between each other and/or with a control unit housed on the motor vehicle side, the exterior rear view mirror housing can be designed in at least two parts. A first housing part forms the housing base, for example, and a second housing part forms the housing cover. At the same time, one of both housing parts can include the frame with the walls surrounding the opening, as well as, if necessary, the housing section lying around the opening for the mirror glass.

In summary, an exterior rear view mirror of an exterior rear view mirror assembly consists of several components connected to each other, for example, a one-piece or multi-piece exterior rear view mirror housing, which consists of a housing base, housing cover and the frame, if necessary, a base bracket housed therein, an adjustment device arranged thereon, a mirror glass and a backing plate bearing this and attached to the adjustment assembly, as well as, if necessary, at least one electrical component, at least partly housed inside the exterior rear view mirror housing, for example, an electromotive activation for the adjustment device.

SUMMARY OF THE INVENTION

The object is in the development and production of motor vehicle parts, such as perhaps an exterior rear view mirror assembly or an exterior rear view mirror, a simple, time-saving, and cost-effective production and assembly.

Exterior rear view mirror assemblies or exterior rear view mirrors with assembly concepts, which include a multiplicity of time-consuming work steps for the production of mechanical and/or electrical connections between individual components and/or component groups in each case, are contrary to this aim.

An exterior rear view mirror of a motor vehicle is known in U.S. Pat. No. 7,448,589 B2. The exterior rear view mirror consists of a base bracket, a one-piece exterior rear view mirror housing arranged on the base bracket, with a rear-facing opening for a mirror glass, and a frame integrated into the exterior rear view mirror housing with the walls surrounding the opening, as well as an electromotively activated adjusting device, arranged on the base bracket, for a backing plate, on which the mirror glass is arranged. For the assembly of the exterior rear view mirror, firstly, it is necessary to connect the base bracket and the exterior rear view mirror housing together, and following this, to attach the electromotively activated adjusting device to the base bracket through the rear-facing opening, which is surrounded by the frame on the exterior rear view mirror housing.

The disadvantage of this is the complex, time-intensive and cost-intensive assembly of the components and the electrical components, caused by poor accessibility, as well as their connections to one another through the rear-facing opening surrounded by the frame.

An object of the invention is the creation of an improved exterior rear view mirror for a motor vehicle, which allows for a simple and cost-effective production and assembly.

The object is achieved by an exterior rear view mirror with an exterior rear view mirror housing, a base bracket, at least partly accommodated in the exterior rear view mirror housing, a frame with walls, which surround an opening arranged on the rear side of the exterior rear view mirror housing, for a mirror glass, and an adjusting device, attached to the base bracket, for the mirror glass, wherein the frame being attached to the base bracket by means of the adjusting device; and process for assembly of an exterior rear view mirror with: an exterior rear view mirror housing, a base bracket, at least partly accommodated in the exterior rear view mirror housing, a frame with walls, which surround an opening arranged on the rear side of the exterior rear view mirror housing, for a mirror glass, and an adjusting device, fixed on the base bracket, for the mirror glass, wherein the following process steps: alignment of the frame and the adjusting device in relation to one another and attachment of the frame to the base bracket by means of the adjusting device.

A first subject of the invention thus concerns an exterior rear view mirror with:
an exterior rear view mirror housing,
a base bracket, at least partly accommodated in the exterior rear view mirror housing,
a frame with walls, which surround an opening, arranged on the rear side of the exterior rear view mirror, for a mirror glass, and
an adjusting device, fixed on the base bracket, for a backing plate, on which the mirror glass is arranged.

The exterior rear view mirror is characterized in that the frame provided for surrounding the mirror glass is fixed on the base bracket by means of the adjusting device.

Advantages resulting from this, in relation to the prior art, are unrestricted accessibility to the electrical and mechanical connections to be produced in the exterior rear view mirror housing, through to fastening the adjusting device on the base bracket. Inter alia, further advantages are given in that the frame, still before fastening of the adjusting device on the base bracket, can be aligned so that it is easily accessible in relation to the adjusting device, and if necessary, can be fixed on and/or attached to this.

The frame can comprise a part provided for its attachment to the base bracket by means of the adjusting device.

The section can be formed in the shape of a bowl, whereby the bowl edge forms the walls surrounding the opening provided on the rear side of the exterior rear view mirror housing. In the region of the bowl base, the frame is attached to the base bracket by means of the adjusting device.

The bowl-shaped section can have a lattice form at least between the bowl edge and the bowl base. This serves for both a saving of weight, as well as a visual control and/or assembly aid during assembly of the exterior rear view mirror, for example, in order to see whether the mechanical and electrical connections, provided if necessary, are produced properly, and that the electrical connections, provided if necessary, run properly and do not become jammed or disconnected.

The fastening of the frame to the base bracket by means of the adjusting device can take place by means of fastening means at least also provided for the attachment of the adjusting device to the base bracket.

Additionally, the attachment of the frame to the base bracket by means of the adjusting device can be effectuated by the frame being held tightly to the base bracket itself, for example, by the adjusting device, and/or by being clamped in a friction-locked manner, for example, as a section of the frame, which is provided for attachment to the base bracket by means of the adjusting device, is arranged between the adjusting device and the base bracket.

Here, the section of the frame provided for attachment to the base bracket by means of the adjusting device can at least partly encompass and/or engage behind the adjusting device, seen from the opening provided on the rear side of the exterior rear view mirror housing for the mirror glass.

In a part of the section at least partly encompassing and/or engaging behind the adjusting device, through-openings can be provided at least for the fastening means serving for the attachment of the adjusting device to the base bracket, these so that the frame is attached to the base bracket by means of the adjusting device itself, and in addition, by means of the fastening means provided for its attachment to the base bracket.

The frame can be connected to the adjusting device. Preferably, this connection is situated on the side of the adjusting device facing the base bracket, particularly preferably, between the adjusting device and the base bracket.

For one of the named attachments and/or for production of one of the named connections, both interlocking and friction-locking connection types are suitable, such as by means of screws, bolts, shear pins, nuts, nails, staples, rivets, for example, as well as firmly bonded connection types, such as by means of welding, soldering, or adhesive bonding, for example.

The frame can form a housing section surrounding the opening for the mirror glass. The housing section here forms at least one part of an external contour of the exterior rear view mirror housing.

The frame can form or include a housing part, comprising the opening for the mirror glass, of an exterior rear view mirror housing formed in at least two parts, or can be formed or included by a housing part of this type.

The exterior rear view mirror housing can here consist of at least a first housing part and a second housing part, both of which can be connected to the base bracket, which is provided if necessary. One of both housing parts can include a housing section lying around the opening for the mirror glass, as well as, if necessary, the frame with the walls surrounding the opening. The first housing part and the second housing part border each other along at least one connection joint. At least the housing part including the frame with walls surrounding the opening, as well as, if necessary, the housing section lying around the opening for the mirror glass, is attached to the base bracket by means of a bolted connection, for example, by means of the adjusting device.

It is important to emphasise that alternatively or additionally to a bolted connection, any other force-fit and/or interlocking and/or firmly bonded connection methods, such as, for example, glued or welded locking connections, riveted joints or combined plug and screw or locking connections can be used here if necessary. As an example of this, a locking connection, alone or suitable in combination with another connecting method, also denoted as a clip connection or a snap connection, includes corresponding locking elements, of which at least one is elastically deformable, and following a deformation, hooks detachably or inextricably with at least another to produce the locking connection. Examples of corresponding locking elements of this type are a rearward engagement and an elastically deformable locking means engaging therein.

A second item of the invention relates to a process for assembly of an exterior rear view mirror for a motor vehicle. The process is characterized in that the frame, provided for bordering the mirror glass, and the adjusting device are firstly aligned in relation to one another, as well as connected to one another if necessary, and the frame is subsequently attached to the base bracket by means of the adjusting device.

The process permits the advantages of a previously described exterior rear view mirror to be used during its assembly. Embodiments of the process result from the previously described different options for the embodiment of the exterior rear view mirror and its components, component groups, as well as electrical components provided if necessary.

Further features of the invention result from the claims, description and drawings.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE DRAWINGS

Figure 1:
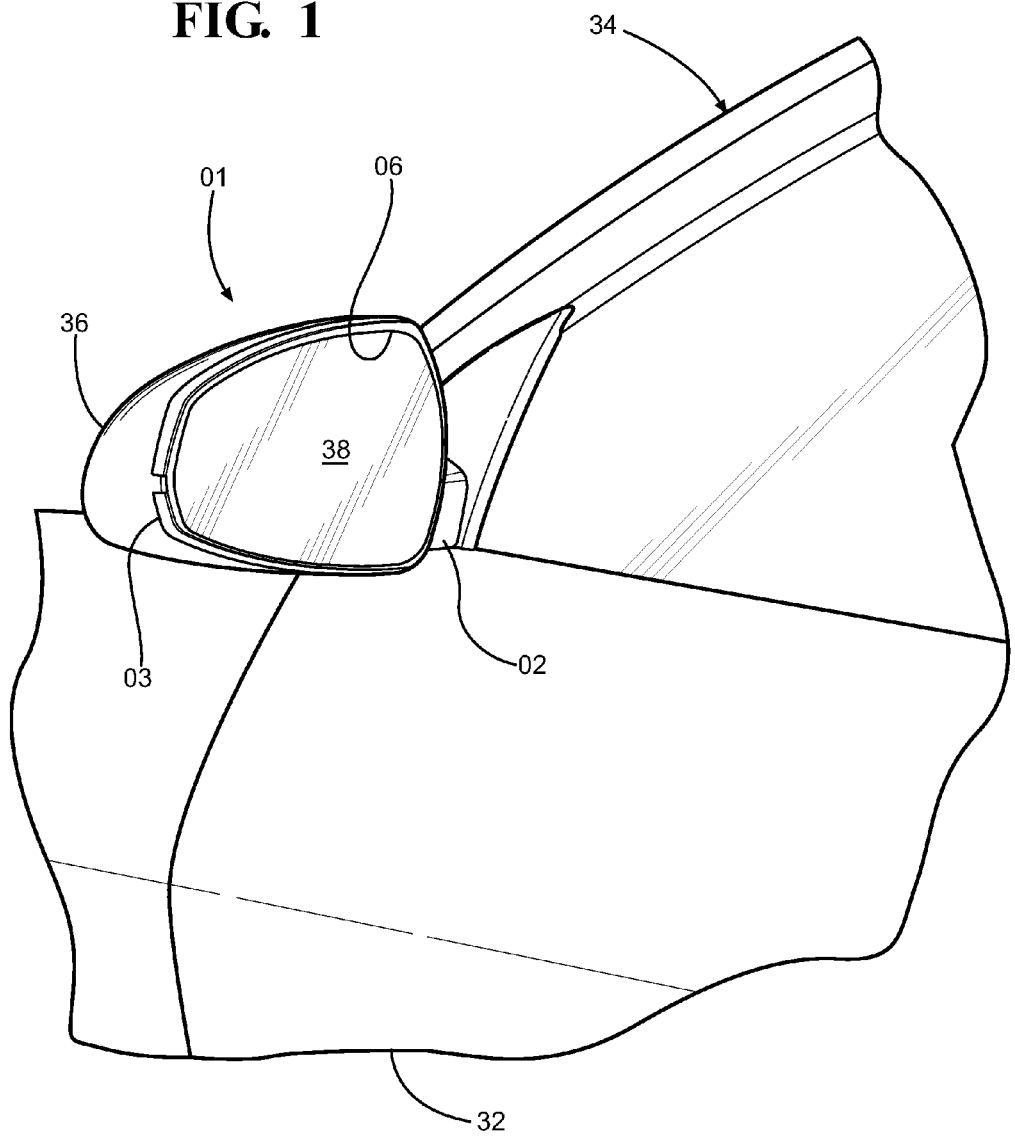
FIG. 1 is a perspective view of a motor vehicle, partially cut away, with an exterior rear view mirror incorporating one embodiment of the invention.

Referring to FIG. 1, an exterior rear view mirror assembly 01 is generally shown secured to a side 32 of a motor vehicle 34. The exterior rear view mirror assembly 01 is secured to the side 32 of the motor vehicle 34 using a base bracket 02. The exterior rear view mirror assembly 01 includes a forward facing housing 36 and a reflective mirror glass 38 extending through a primary opening 06 in the mirror housing 36.

Figure 2:
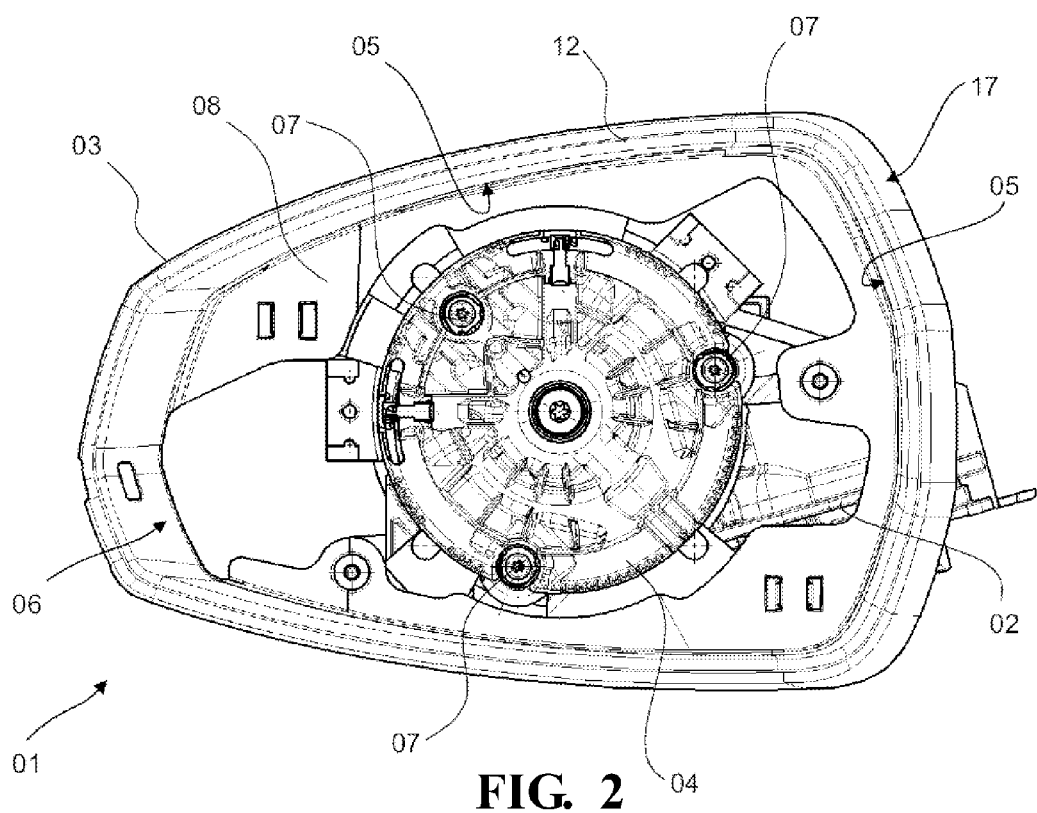
FIG. 2 is a side view of an exterior rear view mirror, seen from its rear side, with the backing plate bearing the mirror glass being removed.
Figure 3:
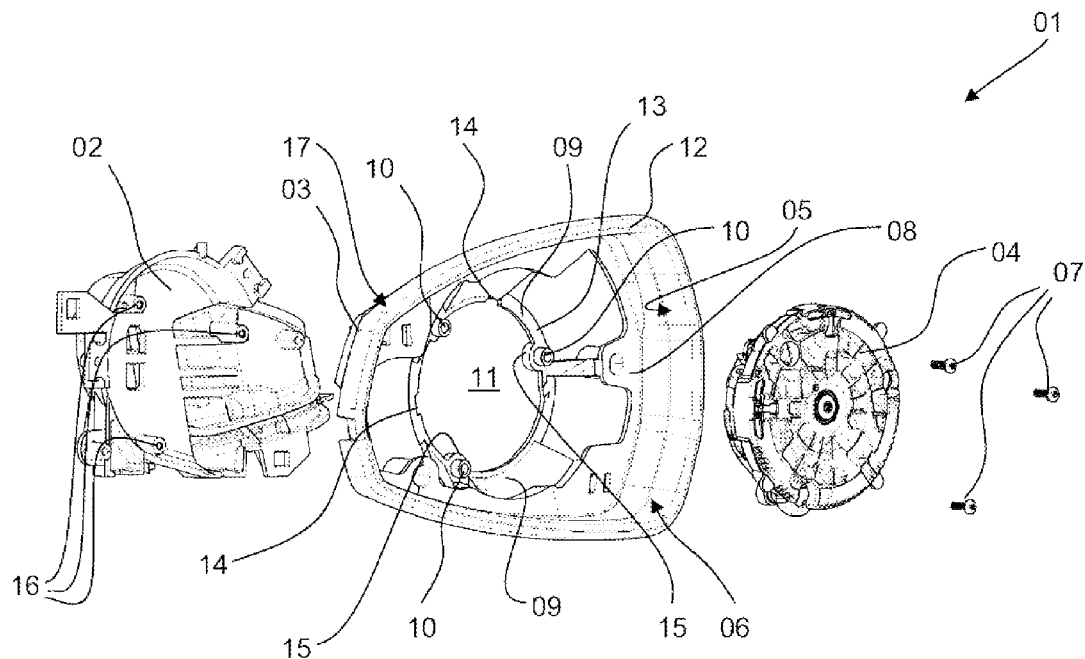
FIG. 3 is an exploded perspective view of an attachment of an opening provided on the rear side of the exterior rear view mirror from FIGS. 1 and 2 for a frame surrounding a mirror glass by means of an adjusting device on a base bracket from a perspective view.
Figure 4:
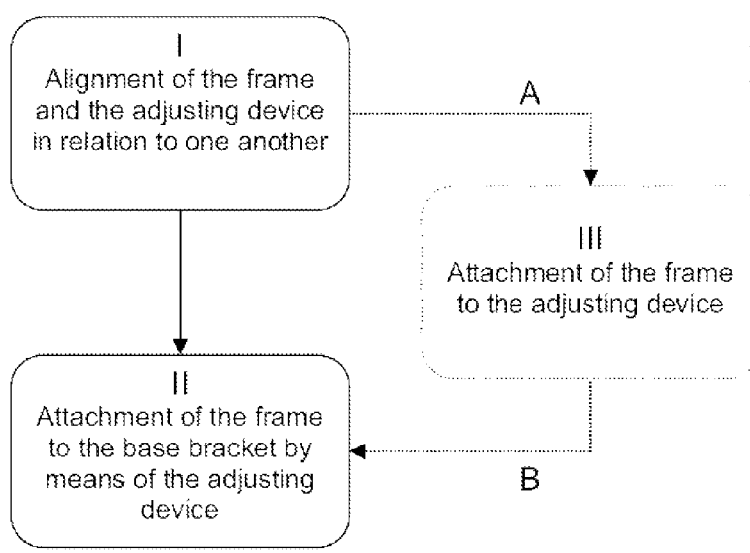
FIG. 4 is a flow chart of a process for assembly of the attachment shown in FIG. 3 of an opening provided on the rear side of the exterior rear view mirror from FIG. 2 for the frame surrounding the mirror glass by means of the adjusting device on the base bracket.
Figure 5:
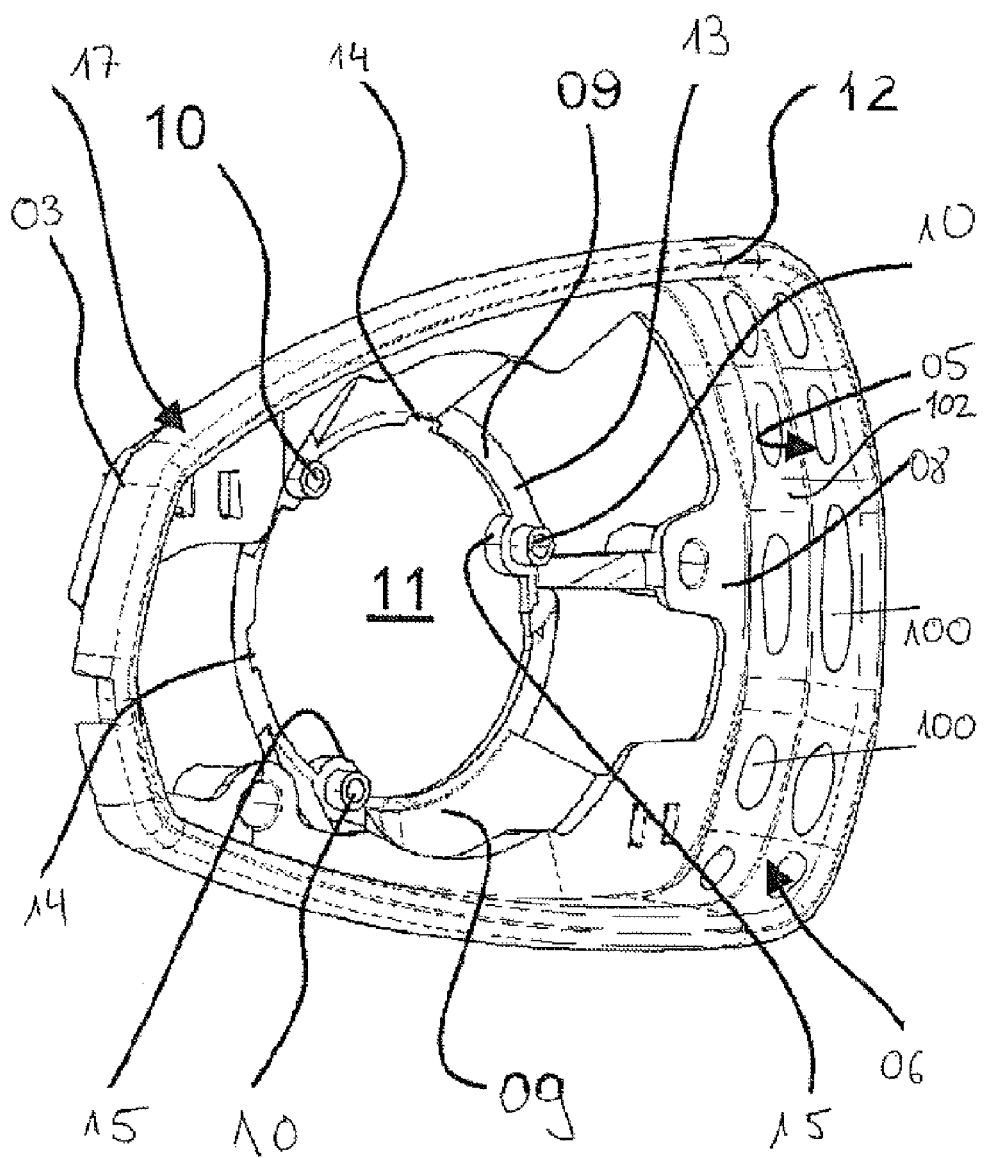
FIG. 5 is a perspective view of an alternative embodiment of the frame for the inventive assembly.

The exterior rear view mirror assembly 01, partly shown in FIGS. 1 through 3, for the motor vehicle 34 essentially includes the exterior rear view mirror housing 36, the base bracket 02 at least partly housed in an exterior rear view mirror housing 36, a frame 03 circumscribing the primary opening 06, and an adjusting device 04, for the mirror glass 38, attached to the base bracket 02. The adjusting device 04 preferably has an electromotive activation. An adjusting device 04 of this type can thus be denoted as an actuator for the mirror glass 38. As can be seen in the Figures, the base bracket 02 is formed of a unitary construction. More specifically, the base bracket 02 is a single piece.

The frame 03 has walls 05, which surround the opening 06 arranged on the rear side of the exterior rear view mirror housing 36, for the mirror glass 38.

The frame 03 serves for bordering the mirror glass 38. The frame 03 allows for fulfilling a legal regulation to protect third parties from injuries, for example, which gives permissible minimum radii, which must at least be observed, at least on unprotected, exposed points. The frame 03 protects the edges on the borders of the mirror glass 38, so that these are not exposed. This is necessary, since the minimum radii required by the legal regulation cannot be met in mirror glasses 38. The frame 03 is attached to the base bracket 02 by using the adjusting device 04.

The adjusting device acts on a backing plate, on whose side facing the opening 06 on the rear side of the exterior rear view mirror housing 01, the mirror glass 38 is arranged.

Fasteners 07 attach the frame 03 and the adjusting device 04 to the base bracket 02. These fasteners 07 may be screws, for example.

The frame 03 may include a section 08 provided for its attachment to the base bracket 02 using the adjusting device 04. Seen from the opening 06 for the mirror glass 38, which provides access to the rear side of the exterior rear view mirror housing 36, the section 08 surrounds and/or engages behind the adjusting device 04, at least in parts.

In a part 09 of the section 08 at least partly surrounding and/or engaging behind the adjusting device 04, through-openings 10 for the fasteners 07 serving for attaching the adjusting device 04 to the base bracket 02 can be provided. In addition, in the part 09 of the section 08 at least partly surrounding and/or engaging behind the adjusting device 04, at least one through-opening 11 can be provided for at least one surface of the adjusting device 04 coming into contact with the base bracket 02.

The section 08 is preferably designed in a bowl form. The bowl edge 12 forms or includes the walls 05 surrounding the opening 06 provided on the rear side of the exterior rear view mirror housing 36. In the region of the bowl base 13, the frame 03 is attached to the base bracket 02 by means of the adjusting device 04.

The bowl-shaped section 08 can have a lattice form at least between the bowl edge 12 and the bowl base 13. The lattice form is the portion 102 of the wall 05 that defines holes 100 that extend through the wall 05.

The frame 03 is held tightly by the adjusting device 04 in a friction-locked manner. As an example, for a secure, interlocking mounting, recesses 14 and/or protrusions 15, for example, may be provided on the frame 03 and related protrusions and/or recesses may be provided on the adjusting device 04. For example, several recesses 14 and protrusions 15 can be provided on the bowl base 13, e.g. equally distributed over the extent, lying around the through-opening 11. On its surface in contact with the base bracket 02 through the through-opening 11, the adjusting device 04 has surface portions corresponding to the recesses 14 and protrusions 15.

Entrances 16 for the fasteners 07 are provided on the base bracket 02. The entrances can be designed, for example, as openings or holes e.g. in the form of blind holes, into which tapping screws, may be screwed. Alternatively, the openings of the entrances 16 may be provided with an internal thread, into which fasteners designed as threaded screws can be screwed. In the process, the entrances 16 can have the external shape of domes standing on the base bracket 02, which are equipped, in each case, with a hole running along its axis, provided with an internal thread, if necessary.

It is important to emphasize that the entrances 16 and the fasteners 07 can also be designed the other way round to the way previously described. In the present execution example, this means that the entrances 16 can be provided with threaded rods, for example, which project through the through-passage openings 10 in the bowl base 13 of the section 08 of the frame 03 and through the adjusting device 04. In this instance, the fasteners 07 are designed as nuts.

It is also important to emphasize that the frame 03, independently of the attachment to the base bracket 02 via the adjusting device 04, may be separately connected to the adjusting device 04. For this purpose, for example, one or several connections, e.g., one or several locking and/or bolted connections between the frame 03 and the adjusting device 04 can be provided. The frame 03 is connected here to the adjusting device 04, preferably to the side of the adjusting device 04 facing the base bracket 02, e.g., between the adjusting device 04 and base bracket 02.

The frame 03 can form a housing section 17 surrounding the opening 06 for the mirror glass 38. The housing section 17 here forms at least one part of an external contour of the exterior rear view mirror housing.

In order to increase the stability of the exterior rear view mirror 01 following the attachment to the base bracket 02 using the adjusting device 04, the frame 03 can also be connected to the base bracket 02 by fasteners 07 provided for this purpose.

Referring to FIG. 3, process shown schematically for the assembly of an exterior rear view mirror 01 with:
- an exterior rear view mirror housing,
- a base bracket 02, at least partly accommodated in the exterior rear view mirror housing 36,
- a frame 03 with walls 05, which surround an opening 06 arranged on the rear side of the exterior rear view mirror housing, for a mirror glass 38, and
- an adjusting device 04, attached on the base bracket 02, for a backing plate, on which the mirror glass 38 is arranged, essentially consists of two process steps I, II.

The process starts in a first process step I with the frame 03 and the adjusting device 04 being aligned in relation to one another. During the alignment in relation to one another, both the frame 03 and the adjusting device 04 are preferably not connected to any other component or any other component group of the exterior rear view mirror 01, so that both the frame 03 as well as the adjusting device 04 can be handled freely.

In a second process step II, the process provides an attachment of the frame 03 to the base bracket 02 using the adjusting device 04. For this purpose, the frame 03 previously aligned to the adjusting device 04 is thus attached to the base bracket 02, as the adjusting device 04 is attached to the base bracket 04. This therefore saves a separate work step of a separate attachment of the frame 03 to the base bracket 02. A separate work step of this type for attachment of the adjusting device 04 to the base bracket 02, required according to the prior art, after the frame has already been mounted on the base bracket 02, is also complicated to achieve, since accessibility through the frame is very limited.

In an alternative arrangement of the process, indicated by the dotted arrows A and B, a third process step III takes place after the first process step I and before the second process step II. This third process step III provides that the frame 03 is attached to the adjusting device 04 before the attachment to the base bracket 02 using the adjusting device 04. In the process, the adjusting device 04 and frame 03 are freely accessible on all sides, so that an additional process step of this type can be carried out easily, and in all cases, there is a saving in relation to an attachment of the adjusting device 04 to the base bracket 02, according to the prior art, which could only be implemented with high expenditure of time, after the frame 03 has already been attached to the base bracket 02.

Advantages of the invention are given in that currently in the prior art, in a first work step, the frame must first be attached to the base bracket by means of separate screws, before e.g. electrical and/or mechanical connections must then be produced in further steps in the inside of the exterior rear view mirror, which has poor accessibility limited by the frame. In a separate work step, in the prior art, the adjusting device must then also be attached to the base bracket by means of separate fastening means, e.g. also screws.

The present invention facilitates either the saving of or the simplified execution of a work step, since the frame 03 is now attached to the base bracket 02 by means of the adjusting device 04.

The invention is particularly commercially applicable in the production of exterior rear view mirror assemblies for motor vehicles.

LIST OF REFERENCE CHARACTERS

01 Exterior rear view mirror
02 Base bracket
03 Frame
04 Adjusting device
05 Wall
06 Opening
07 Fastening means
08 Section of the frame
09 Part of the section
10 Through-opening
11 Through-opening
12 Bowl edge
13 Bowl base
14 Recess
15 Protrusion
16 Entrance
17 Part of the external contour of the exterior rear view mirror housing
32 side of a motor vehicle
34 motor vehicle
36 exterior rear view mirror housing
38 mirror glass
I Process step
II Process step
III Further process step
A, B Alternative procedure

We claim:

1. An exterior rear view mirror comprising:
   a base bracket attached to a motor vehicle and extending out from the motor vehicle;
   an exterior rear view mirror housing attached to said base bracket such that said base bracket is partly accommodated within said exterior rear view mirror housing;
   an adjusting device fixedly secured to said base bracket;
   a backing plate having an orientation and secured to said adjusting device such that said adjusting device adjusts the orientation of said backing plate with respect to said base bracket;
   a mirror arranged on said backing plate;
   a frame having walls defining an opening arranged on a rear side of said exterior rear view mirror housing, such that said frame is connected to said adjusting device between said adjusting device and the base bracket, wherein said adjusting device secures said frame to said base bracket, wherein said frame includes a section to be received by said adjusting device for attachment of said frame operatively to said base bracket, wherein said section of said frame provided for attachment to said base bracket by said adjusting device, seen from an opening provided on said rear side of said exterior rear view mirror housing for said mirror, at least partly encompasses and/or engages behind said adjusting device; and
   fasteners to secure said adjusting device to said base bracket, wherein said fasteners extends directly through through-openings in said section at least partly encompassing and/or engaging behind said adjusting device to attach said adjusting device to said base bracket.

2. An exterior rear view mirror according to claim 1, wherein said adjusting device clamps said frame to said base bracket in a friction-locked manner.

3. An exterior rear view mirror according to claim 1, wherein said section is designed in a bowl shape, whereby a bowl edge forms or includes said walls surrounding said opening provided on said rear side of said exterior rear view mirror housing, and in the region of said bowl base, said frame is attached to said base bracket by said adjusting device.

4. An exterior rear view mirror according to claim 3, wherein said bowl-shaped section includes a lattice form between said bowl edge and said bowl base.

5. An exterior rear view mirror according to claim 4, wherein said frame forms a housing section surrounding said opening for said mirror.

6. An exterior rear view mirror according to claim 5, wherein said housing section forms at least one part of an external contour of the exterior rear view mirror housing.

7. An exterior rear view mirror according to claim 6, wherein said frame defines said opening for said mirror and includes at least two parts.

8. A method for assembling an exterior rear view mirror having an exterior rear view mirror housing,
   a base bracket, at least partly accommodated in the exterior rear view mirror housing,
   a frame with walls, which surround an opening arranged on the rear side of the exterior rear view mirror housing, for a mirror, and
   an adjusting device, fixed on the base bracket, for the mirror,
   a backing plate having an orientation and secured to the adjusting device such that the adjusting device adjusts the orientation of the backing plate with respect to the base bracket;
   the mirror arranged on the backing plate;
   wherein the frame includes a section to be received by the adjusting device for attachment of the frame operatively to the base bracket, wherein the section of the frame provided for attachment to the base bracket by the adjusting device, seen from an opening provided on the rear side of the exterior rear view mirror housing for the mirror, at least partly encompasses and/or engages behind the adjusting device; and
   fasteners to secure the adjusting device to the base bracket, wherein the fasteners extends directly through through-openings in the section at least partly encompassing and/or engaging behind the adjusting device to attach the adjusting device to the base bracket;
   wherein the method includes the steps of:
   aligning the frame and the adjusting device in relation to one another; and
   attaching the frame to the base bracket by attaching the adjusting device to the base bracket with the frame secured therebetween.

* * * * *